US006574530B1

(12) United States Patent
Bertone

(10) Patent No.: US 6,574,530 B1
(45) Date of Patent: Jun. 3, 2003

(54) INTERACTIVE MOVABLE WAITING STATION

(75) Inventor: Fabrizio Bertone, Piazza Gran Madre di Dio, 10 I-10133, Torino (IT)

(73) Assignee: Fabrizio Bertone, Turin (IT)

( * ) Notice: Subject to any disclaimer, the term of this patent is extended or adjusted under 35 U.S.C. 154(b) by 52 days.

(21) Appl. No.: 09/594,863

(22) Filed: Jun. 15, 2000

(30) Foreign Application Priority Data

Jul. 8, 1999 (IT) ........................................ TO99A0593

(51) Int. Cl.[7] .................................................. G06F 7/00

(52) U.S. Cl. ........................ 700/230; 700/228; 198/321

(58) Field of Search ................................ 198/321, 213, 198/228; 700/230

(56) References Cited

U.S. PATENT DOCUMENTS 3,814,020 A 6/1974 Oliver ......................... 104/25
5,600,114 A 2/1997 Dunlap et al. .............. 235/379
6,177,887 B1 * 1/2001 Jerome ....................... 340/945

* cited by examiner

*Primary Examiner*—Joseph A. Dillon
(74) *Attorney, Agent, or Firm*—Moser, Patterson & Sheridan, L.L.P.

(57) ABSTRACT

Interactive movable waiting station, comprising a plurality of seating stations (16) carried by a motorized movable structure (22) adapted to cyclically take the various seating stations (16) in correspondence with a service counter (10) attended by an operator. Each seating station (16) is provided with first computer means (20) electronically connected to second computer means (12) associated with the service counter (10). The first computer means (20) are programmed for enabling the person who occupies the seating station to prepare a service request during the waiting time necessary for taking the person in correspondence with the service counter. The first computer means transfer the request for service to the second computer means (12) before the person who has prepared such request reaches the service counter.

3 Claims, 2 Drawing Sheets

INTERACTIVE MOVABLE WAITING STATION

The present invention relates to a movable waiting station comprising a plurality of seating stations carried by a motorized movable structure adapted to cyclically take the various seating stations in correspondence with a service counter attended by an operator.

A movable waiting station of this type is known from U.S. Pat. No. 3,814,020 which discloses a conveyor system integrated in a building and intended to move people from an entry station to an exit station adjacent to a plurality of attended service counters. People entering in this waiting system can remain seated while queuing for their turn at one of the service counters. Although with a system of this type people can wait seated for their turn, the waiting time for queuing remains unproductive in that transactions between service personnel at the counters and service users take place only by direct contact between the user and the counter operator.

Non-attended service centres are known, provided with automatic apparatus which permit to carry out transactions, for instance bank transactions, without direct contact with service operators. One of such systems is disclosed in U.S. Pat. No. 5,600,114, which discloses a non-attended bank service centre electronically connected to a central banking system. The service centre comprises automatic machines provided with interactive terminals which allow the user to carry out different types of bank transactions. However, totally non-attended service centres of this type are accepted with difficulty from the service users which are traditionally used to the presence of a service operator which can assist them in carrying out the transactions.

In view of this state of the art, the object of the present invention is to provide a movable waiting station which allows the users to interact with a service operator and which permits to obtain a reduction of personnel attending the service counters by optimising work times.

According to the present invention, this object is achieved by an interactive movable waiting station having the features forming the subject of the main claim.

Figure 1:
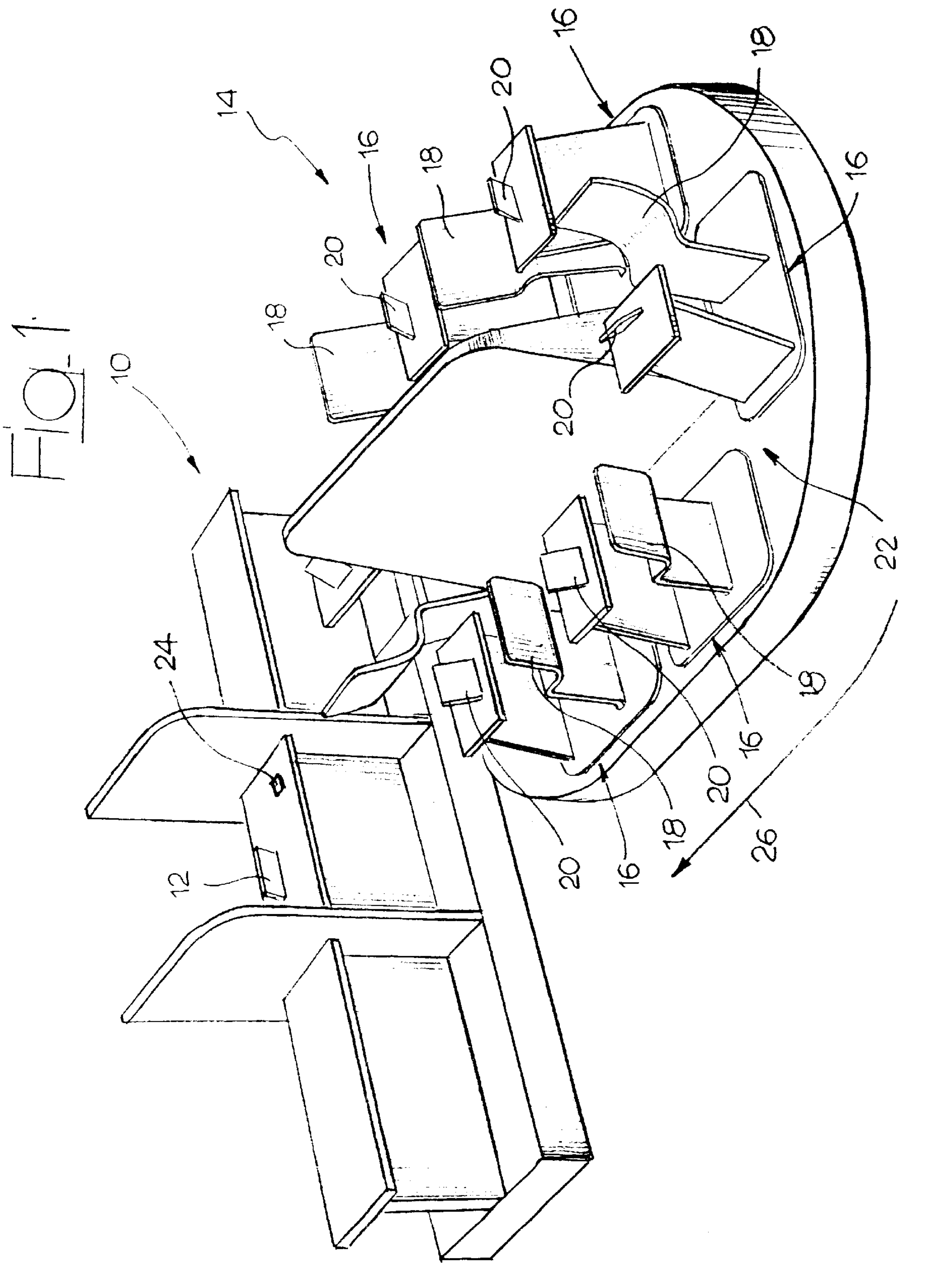
Figure 2:
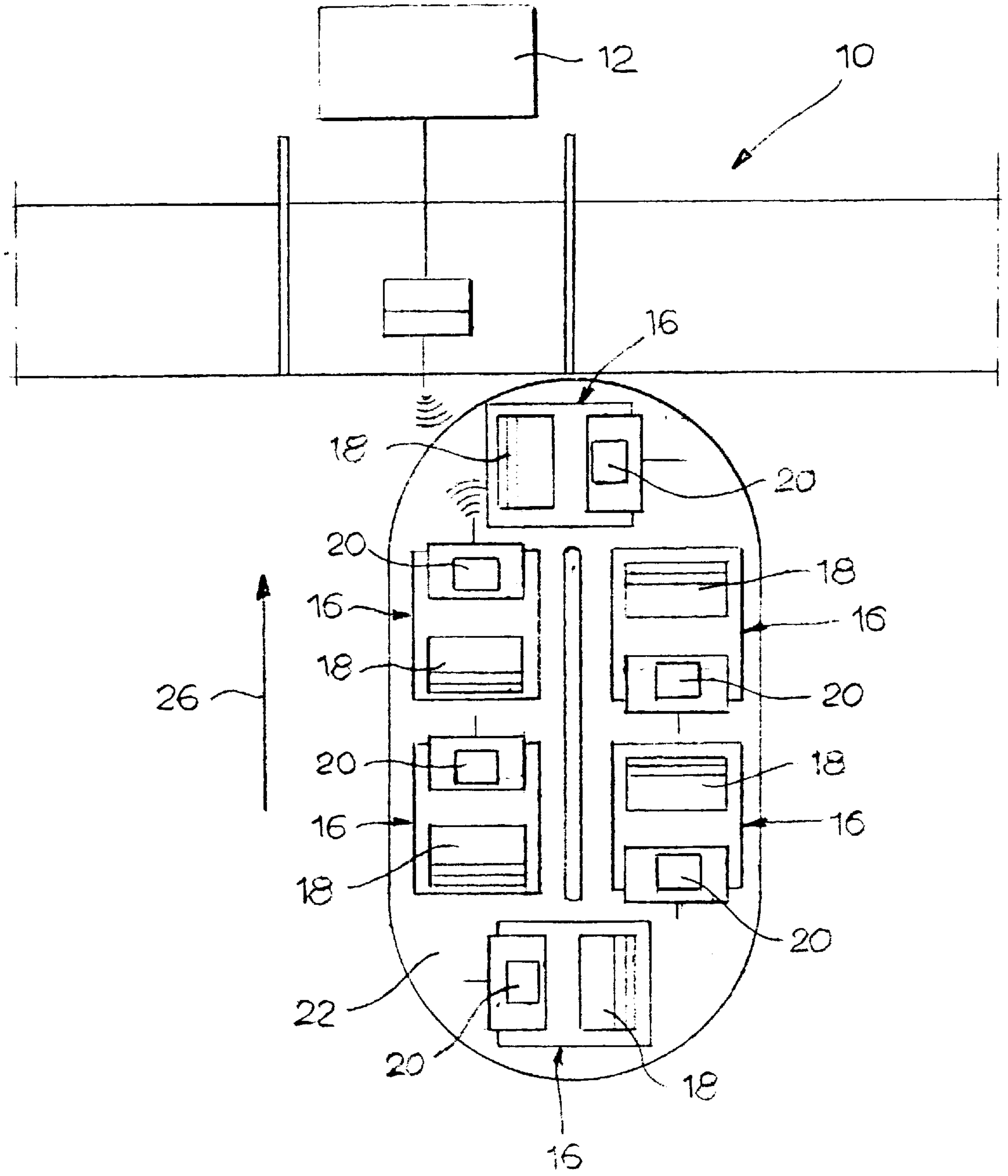

Characteristics and advantages of the present invention will become clear in the course of the detailed description which follows, given purely by way of non-limiting example, with reference to the attached drawings, in which:

FIG. 1 is a schematic perspective view of an interactive waiting station according to the present invention, and FIG. 2 is a plan schematic view of the station of FIG. 1.

With reference to the figures, the numeral reference 10 schematically indicates a service counter attended by an operator and provided with computer means schematically indicated at 12, through which the operator can carry out various transactions (bank transactions, issue of payment receipts, issue of tickets, airport check-in, etc.).

An interactive and movable waiting station 14 is associated with the service counter 10. The waiting station 14 comprises a plurality of seating stations 16 each of which comprises a seat 18 and an interactive terminal 20 electronically connected to the computer means 12 of the counter 10. The various seating stations 16 are carried by a motorized movable structure 12 which can cyclically take the various seating stations in correspondence with the service counter 10. The service operator controls, for instance by means of a push-button 24, the movement of the structure 22, for bringing in correspondence with the service counter 10 a subsequent seating station 16 after having finished a transaction with a person which was staying in front of the counter. The users are sitting in the seating station 16 in order of arrival in the direction of movement indicated by the arrow 26. While the users are waiting for their turn in front of the service counter 10, they can prepare a service request by means of the terminal 20. The service request consists basically of two steps:

selecting the type of transaction which the user desires to carry out, and inputting data or information necessary for carrying out the transaction.

For instance, when the service counter 10 is a bank counter, the user could select among various possible options the function "deposit" and input data of the bank account on which the deposit has to be carried out and all information generally needed for this type of transaction (amount to be deposited, identification of bank checks, number of banknotes to be deposited, etc.). When the service counter 10 is a railway ticket-office, the required transaction could consists in the purchase of a railway ticket and the information to be provided could be the destination, time of departure, class, etc. The interactive terminals 20 can also provide a series of useful information for carrying out the transactions, such as for instance stock value for buying/selling stock, time and costs of transport services, etc. The terminals 20 of the various seating stations 16 prepare the service request and send it to the computer 12 of the service counter 10. The computer 12 can communicate at the same time with all the terminals 20 of the waiting station 14 or, as an alternative, can be programmed for receiving information on the requested service only from the seating station 16 which is in a service position in front of the counter 10. Information between terminals 20 and computer 12 can be transferred by means of radio or infrared wireless devices. For protecting confidentiality of information provided by the users, the terminals 20 are programmed for deleting any information provided by the user after having transferred the request for service to the computer 12.

When the user reaches the service counter 10, his service request has already been received by the computer 12 of the service counter 10. The operator checks the requests and issues a receipt. Depending on the type of transaction, the operator can require a signature of the user on a form printed on the basis of the information provided by the user by means of the interactive terminal 20, can receive documents or money and issue a receipt. For certain type of transactions which require a payment, the interactive terminals 20 can be programmed for allowing the user to carry out the payment by means of payment cards (credit or debit cards, etc.) possibly after the user has input a secret code.

From the preceding description it will be clear that the waiting station according to the present invention introduces a change in the relationship between the users and the service operators and allows a reduction of service personnel and waiting times, and eliminates also the need for preprinted forms which the users must often fill in uncomfortable conditions before queuing.

What is claimed is:

1. An interactive movable waiting station adapted for use with a service counter for randomly servicing any of a plurality of users, said service counter comprising a computer attended by an operator and a service position opposite said operator, said waiting station comprising a motorized movable structure carrying a plurality of seating stations comprising a seat and an interactive computer terminal, said structure adapted to be randomly movable such that any seat may assume said service position, each computer terminal electronically connected to said computer and being programmed for enabling any instant user to prepare a service request during a waiting time defined by the number and order of any of a plurality of other users engaging said waiting station ahead of said instant user, said computer terminal also adapted to transfer a service request to the computer before the seat which the instant user occupies reaches the service position.

2. The waiting station according to claim 1, wherein said computer terminals are programmed for enabling the choice of the service request which a user wants to carry out and for obtaining information necessary for carrying out such service request.

3. The waiting station according to claim 2, wherein said computer terminals are programmed for deleting the information provided by a user after having transferred the service request to the second computer means.

* * * * *